United States Patent [19]

Butka

[11] 4,431,075
[45] Feb. 14, 1984

[54] WHEEL FOR VEHICLE

[76] Inventor: Kemal Butka, 372 Central Park West, New York, N.Y. 10025

[21] Appl. No.: 396,690

[22] Filed: Jul. 9, 1982

[51] Int. Cl.³ .............................................. B62D 55/00
[52] U.S. Cl. ........................................ 180/10; 180/74; 305/7
[58] Field of Search ..................... 180/10, 74; 305/6, 7

[56] References Cited

U.S. PATENT DOCUMENTS

| 1,135,533 | 4/1915 | Krarup ....................................... 305/7 |
| 1,339,376 | 4/1920 | Rose ........................................... 305/7 |

FOREIGN PATENT DOCUMENTS

| 365941 | 7/1906 | France ........................................ 305/7 |
| 501826 | 2/1920 | France ........................................ 305/7 |
| 35797 | 7/1906 | Switzerland ............................... 305/7 |

*Primary Examiner*—John A. Pekar
*Assistant Examiner*—D. Lynn Fugate
*Attorney, Agent, or Firm*—Michael J. Striker

[57] ABSTRACT

A wheel for a vehicle has an inner driving element with an outer circumferential surface and an outer driven element with an inner circumferential surface, wherein the outer circumferential surface of the inner driving element has a smaller diameter than the inner circumferential surface of the outer driven element, and thereby the outer driven element is arranged loosely on the inner driving element and has a contact with the latter over a small circumferential region.

12 Claims, 6 Drawing Figures

WHEEL FOR VEHICLE

BACKGROUND OF THE INVENTION

The present invention relates to a wheel for vehicles.

Known wheels for vehicles have an inner driving element arranged to be driven by a rotary drive of a vehicle, and an outer driven element which is driven by the driving element and is formed, for example, as a frame supporting a tire. In the known wheels the inner driving element is connected with the outer driven element over their entire circumferential surfaces so that a driving moment is transmitted from the inner driving element to the outer driven element through the entire contact area of the respective circumferential surfaces. When the wheel is designed so that the driving moment is transmitted from the inner driving element to the outer driven element through the entire circumferential surface thereof, the pressure of the vehicle and the entire friction between the wheel and a road surface takes place in a line of contact between the outer circumference of the wheel, for example the tire, and the road surface. The above described known constructions of the wheels possess considerable disadvantages. Considerable friction takes place between the outer circumferential surface of the tire and the road surface, which reduces the service life of the tires. Considerable energy consumption is required for rotating the wheels with overcoming the friction. Moreover, the wheels are not satisfactory in preventing accidents on slippery surfaces. When the vehicle encounters such natural conditions as slippery driveways in rain or snow or on icy and muddy surfaces, hazardous accidents can take place, in that the vehicles can be thrown out of their course in uncontrollable directions.

SUMMARY OF THE INVENTION

Accordingly, it is an object of the present invention to provide a wheel for a vehicle, which avoids the disadvantages of the prior art.

More particularly, it is an object of the present invention to provide a wheel for vehicles, which is characterized by reduced friction between its outer surface and a road surface, a lower energy consumption for its driving, and improved anti-skid properties.

In keeping with these objects, and with others which will become apparent hereinafter, one feature of the present invention resides, briefly stated, in a wheel for a vehicle which has an inner driving element and an outer driven element formed so that an outer circumferential surface of the inner driving element is of a smaller diameter than an inner circumferential surface of the outer driven element, so that the inner driving element contacts the outer driven element over only a small region of their circumferential surfaces.

When the wheel of a vehicle is designed in accordance with the present invention, it eliminates the disadvantages of the prior art and provides for the following, highly advantageous results:

In the inventive wheel, a greater part of the friction takes place between the circumferential surfaces of the inner driving element and the outer driven element, whereas the friction between the outer circumferential surface of the wheel and a road surface is considerably reduced. It is to be understood that the service life of the tires of the invention wheel is thereincreased. Since the friction is shifted in its greater part from the outer circumferential surface of the wheel to the circumferential surface between the driving element and the driven element, which have smooth surfaces, a certain economy in energy consumption is obtained during transmitting to the road surface of almost only adhesive pressure. In the inventive wheel the outer driven element is arranged loosely on the inner driving element. As a result of this, the outer driven element is rather placed on the road surface than forcibly rotated relative to the latter, and therefore anti-skid properties of the wheel are considerably improved.

The novel features which are considered characteristic for the invention are set forth in particular in the appended claims. The invention itself, however, both as to its construction and its method of operation, together with additional objects and advantages thereof, will be best understood from the following description of specific embodiments when read in conjunction with the accompanying drawing.

DESCRIPTION OF THE PREFERRED EMBODIMENT

Figure 1:
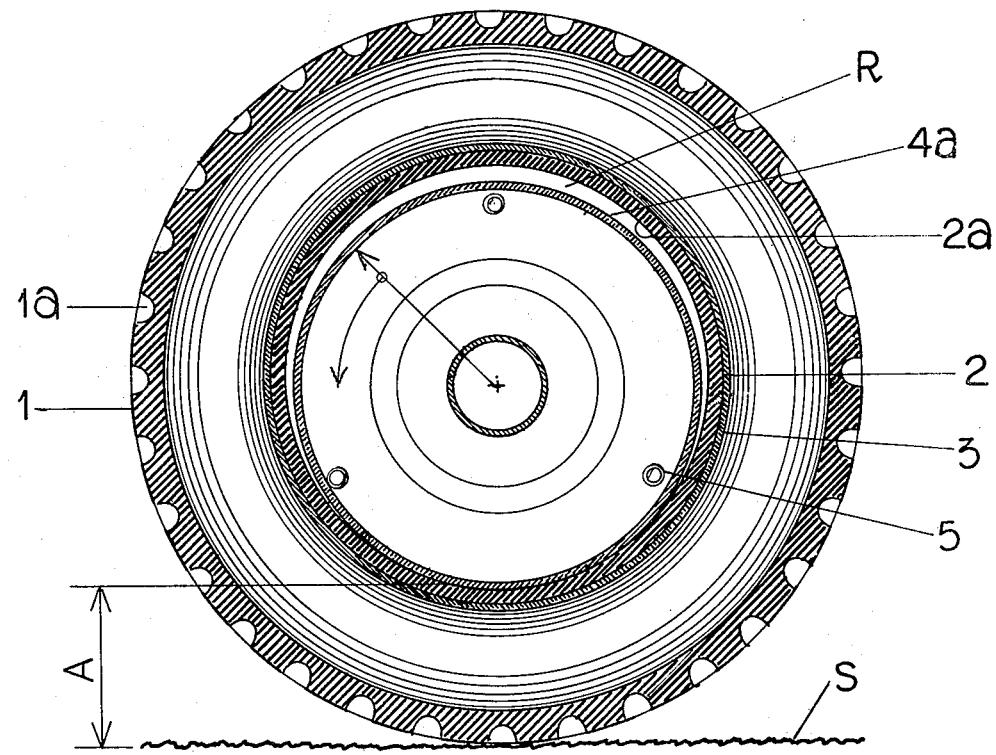
FIG. 1 is a side view showing a section of a wheel in accordance with the present invention.
Figure 2:
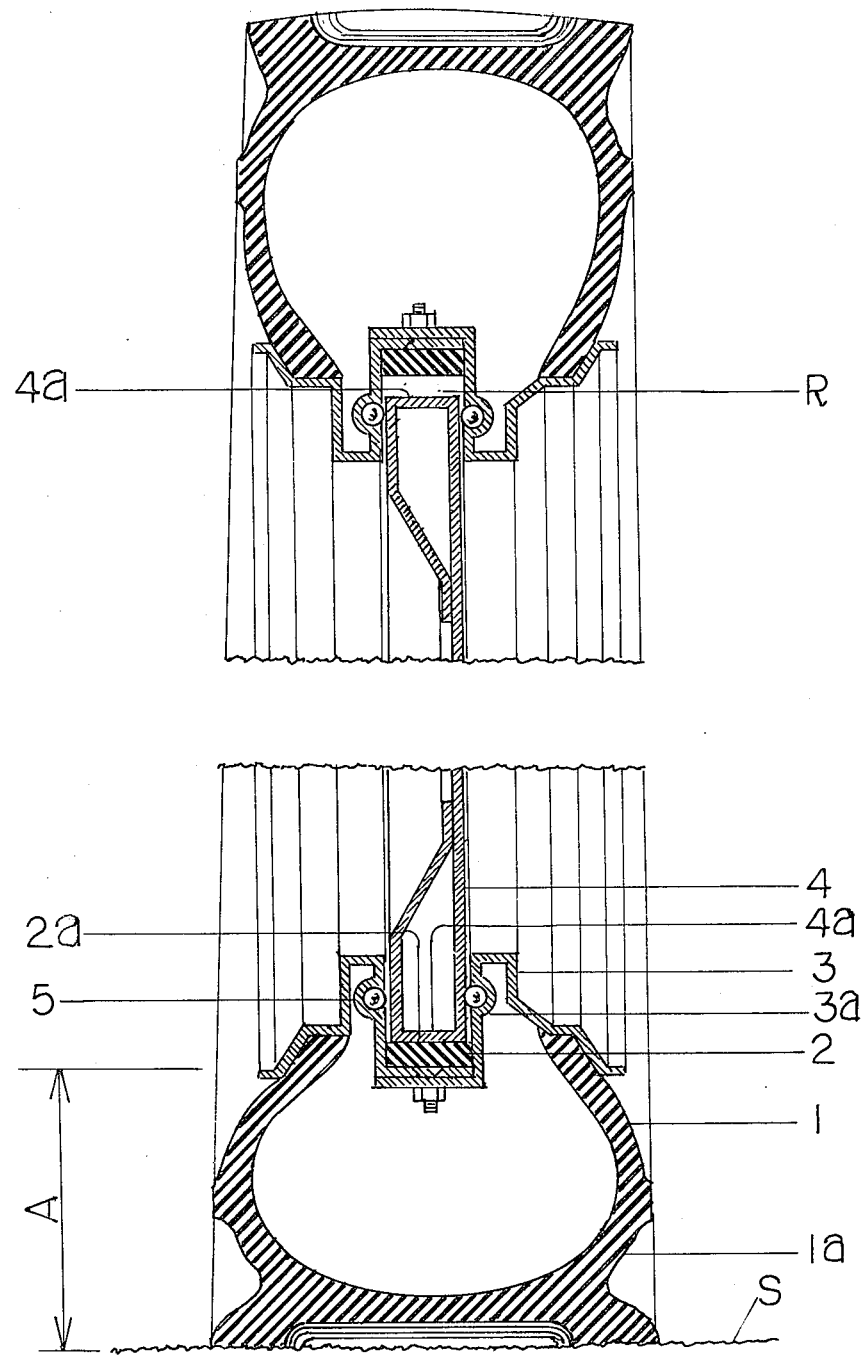
FIG. 2 is a view showing an axial section of the inventive wheel of FIG. 1.
Figures 3, 4:
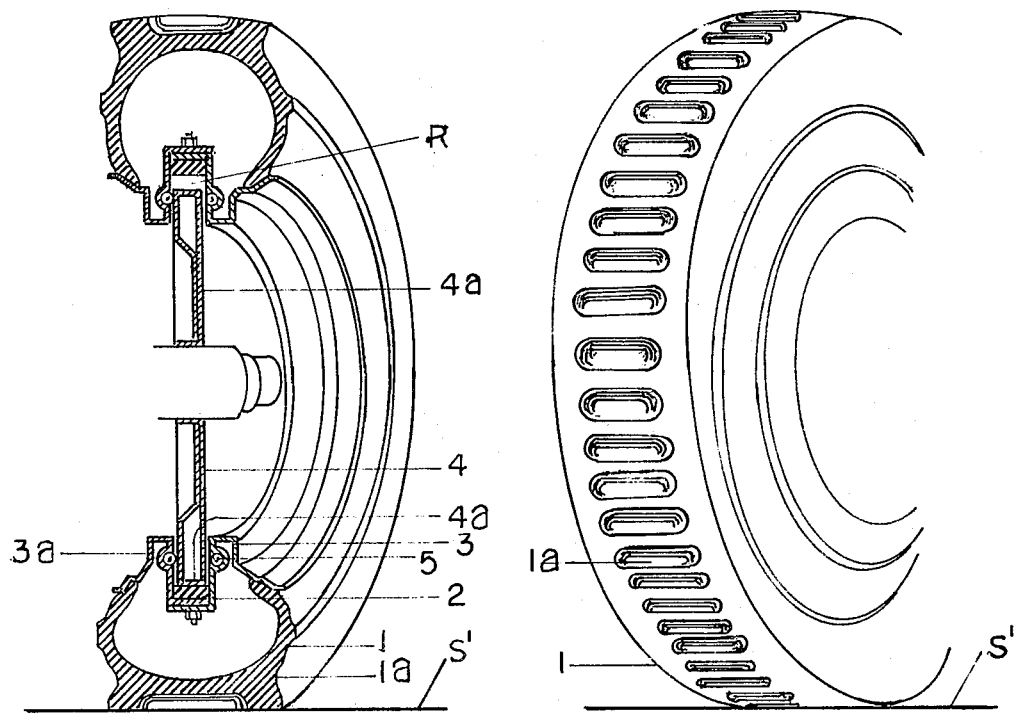
FIG. 3 is a perspective view of the inventive wheel, partially sectioned and showing the interior of the wheel.
FIG. 4 is a perspective view of the inventive wheel showing the outer surface of the latter.

A wheel for a vehicle in accordance with the present invention has an outer part such as for example a conventional rubber tire which is identified by reference numeral 1. A metal frame 3 is arranged radially inside the tire 1 and fixed to the same for joint rotation. The frame 3 can be connected with the tire 1 with a snap action, by gluing, with the aid of mechanical means, or the like.

The outer element shown in the drawing is formed as the rubber tire 1. However, it is to be understood that it can be formed in different ways in dependence upon the requirements made with regard thereto. The frame 3 is composed of two parts arranged axially adjacent to one another and having axially distal portions which engage with the tire 1 and axially proximal portions which are connected with one another, for example by bolts. It is to be understood that the frame 3 can be formed as a one-piece member or, to the contrary, can be composed of more than two parts. A central region formed by the proximal portions of the frame 3 has a cup-shaped cross section with two lateral walls spaced from one another in an axial direction, and one outer wall. An inner surface of the frame 3 in this region is identified by reference numeral 3a.

An elastic member 2 is received in the above-mentioned region of the frame 3 between the lateral walls and the outer wall of the cup-shaped cross section thereof. The elastic member 2 can be formed, for example, as a rubber ring, and is connected with the frame 3 for example by a snap action, by gluing, with the aid of screws, or the like. The rubber tire 1, the frame 3, and the elastic member 2 form together an outer driven element of the wheel in accordance with the present invention.

The wheel has an inner driving element which is identified by reference numeral 4 and is connectable with a rotary drive of a vehicle, for example with a shaft of the latter. The inner driving element 4 is formed as a wheel disk and has a radially outer portion which is received in a groove in the above-mentioned central region of the frame 3a bounded by two lateral walls and the outer wall. The wheel disk 4 has an outer circumferential surface which is identified by reference numeral 4a. Friction-reducing means are provided between the wheel disk 4 and the lateral walls of the frame 3. The friction-reducing means can include three ball bearings at each side of the groove in the frame 3.

As can be seen from the drawing, the outer circumferential surface of the inner driving element or the wheel disk 4 has a diameter which is smaller than the diameter of the inner circumferential surface of the outer driven element or the elastic ring 2. During actual driving, the wheel disk 4 is eccentric relative to the elastic member 2, and thereby a gap or room R remains between the outer circumferential surface of the wheel disk 4 and an inner circumferential surface 2a of the elastic ring 2 over a greater part of their circumference. The inner driving element or the wheel disk 4 transmits a driving moment to the outer driven element or more particularly to the elastic ring 2 via a small contact region which during driving is a lower contact region between the circumferential surfaces 2a and 4a, the region being upwardly spaced from a road surface S. More particularly, the contact region is spaced from the road surface S by a distance which is identified by reference numeral A. The outer driven element including the wheel 1, the frame 3, and the elastic ring 2 is arranged freely or loosely on the inner driving element or the wheel disk 4.

Because of this arrangement, the normally rigid grip of the outer surface of the wheel with the road surface S is interrupted in its rigidity and is transferred instead to the contact region between the circumferential surfaces 4a and 2a spaced by the distance A from the road surface S. Thereby the movement of the vehicle occurs in such a way that the friction is substantially shifted from the road surface S to the contact region of the surfaces 4a, 2a. The circumferential surfaces 4a and 2a are substantially smooth as compared with the road surface S, and thereby the driving friction of the outer circumferential surface of the wheel with the road surface S is reduced to just a sufficient amount so as to keep driving of the vehicle unimpaired at any required speed. It is to be understood that this increases the service life of the inventive wheel and reduces its energy consumption.

The fact that the outer driving member 1, 3, 2 is loosely arranged on the inner driving member 4 provides for improved anti-skid properties. In the inventive wheel, the movement of the wheel over the road surface S is not limited to a forced rotation of the outer circumferential surface of the wheel relative to the road surface S, but can be compared with a continuous placing of successive portions of the outer circumferential surface of the wheel onto the road surface S. Therefore the susceptibility of the inventive wheel to skidding is considerably reduced. It should be mentioned that the elastic member 2 also serves as a shock absorbing member.

The outer circumferential surface of the tire 1 is provided with a plurality of suction formations which increase traction between the wheel and the road surface. The suction formations include a plurality of grooves which are elongated in an axial direction of the wheel and have substantially spherical axial ends. They, first of all, contribute to the anti-skid properties of the inventive wheel, since they come into action when icy or any slippery surface is encountered, to avoid sliding or skidding hazards. The grooves 1a are uniformly distributed over the outer circumferential surface of the tire 1.

Figure 5:
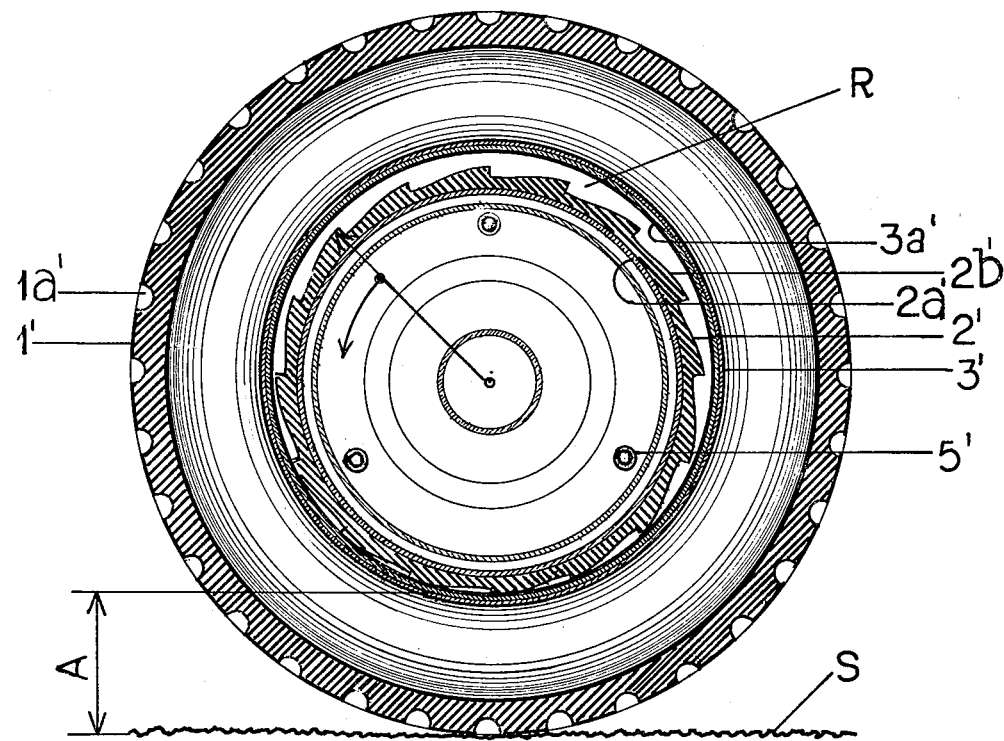
FIG. 5 is a view substantially corresponding to the view of FIG. 1 but showing a wheel in accordance with another embodiment of the invention.
Figure 6:
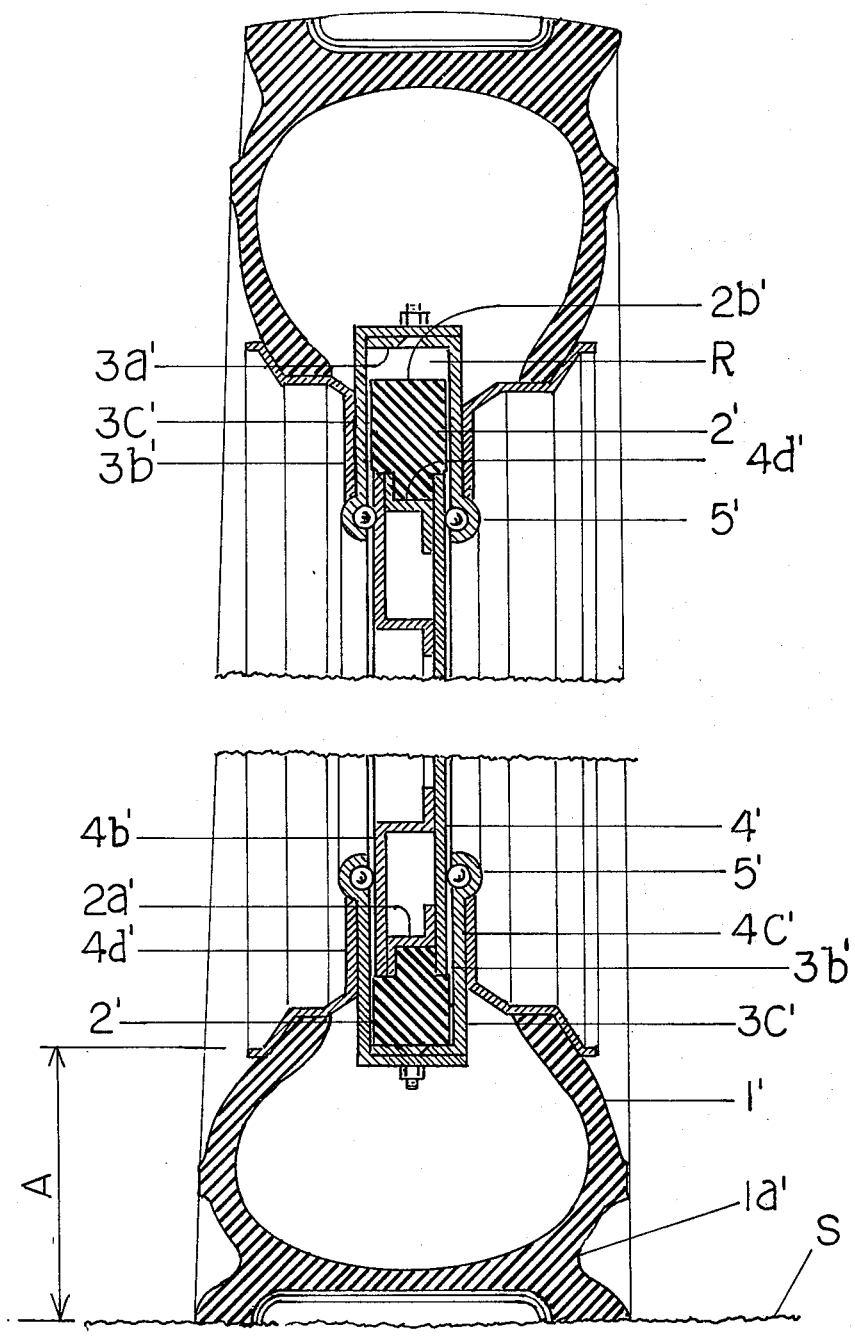
FIG. 6 is a view showing an axial section of the wheel of FIG. 5.

The outer circumferential surface of the elastic ring 2 of the wheel shown in the preceding drawings is smooth. In contrast, an outer circumferential surface 2b' of an elastic ring 2' of the wheel shown in FIGS. 5 and 6 is interrupted. It has a plurality of projections which can be tooth-shaped. Since the outer circumferential surface 2b' is interrupted, its friction against an inner surface 3a' of a frame 3' is reduced. At the same time the action of the elastic ring 2' more closely imitates a walking movement of a living being. When one of the teeth is in engagement with the inner surface 3a' of the frame 3' a next tooth "steps" onto the inner surface 3a'. It is also possible to form the inner circumferential surface of the elastic ring 2' interrupted.

A wheel disc 4' of the wheel shown in FIGS. 5 and 6 also differs from the wheel disc 4 of the wheel in accordance with the preceding embodiment. The wheel disc 4' has two lateral parts 4b' and 4c', and an intermediate parts 4d'' located between the lateral parts and connecting the latter with one another, for example by welding. The frame 3' has two outer lateral parts 3b' engaging with the tire 1', and two intermediate parts 3c' located between the outer lateral parts 3b' and connected with the latter and with one another, for example by welding. The elastic ring 2' is connected in this embodiment not with the frame, but instead with the wheel disc 4'. The gap R is formed here between the inner surface 3a' of the frame 3' and the outer surface 2b' of the elastic ring 2.

It will be understood that each of the elements described above, or two or more together, may also find a useful application in other types of constructions differing from the types described above.

While the invention has been illustrated and described as embodied in a wheel for a vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected be Letters Patent is set forth in the appended claims.

I claim:

1. A wheel for a vehicle, comprising a tire having an outer contact surface of a predetermined axial dimension, and provided with a radially inner frame having an inner circumferential surface of a predetermined diameter and an axial dimension which is considerably smaller than the axial dimension of said contact surface of said tire; and a wheel disk located radially inwardly of said frame, connectable with a rotary drive of a vehicle and having an outer circumferential surface with a diameter which is smaller than the diameter of said inner circumferential surface of said frame and with an axial dimension which is considerably smaller than the axial dimension of said contact surface of said tire, whereby a gap is formed inside the wheel between said circumferential surfaces over a greater circumferential region of the latter and said circumferential surfaces are in contact with one another and thereby transmit a driving moment from said wheel disc to said frame and said tire over a considerably smaller circumferential region of said circumferential surfaces than said greater circumferential region, and over the considerably smaller axial dimension of said circumferential surfaces than said contact surface of said tire, so that said frame with said tire is loosely arranged on said wheel disc and a friction between said contact surface of said tire and a road surface is reduced, whereas an additional friction takes place inside the wheel between said circumferential surfaces, but only within said smaller circumferential region and over said smaller axial dimension of said circumferential surfaces.

2. A wheel for a vehicle as defined in claim 1; and further comprising an inner substantially elastic member located radially inwardly of and connected with said frame so that said inner circumferential surface is formed directly on said elastic member.

3. A wheel for a vehicle as defined in claim 2, wherein said elastic member is formed as a rubber ring interposed between said wheel disc and said frame of said outer driven element.

4. A wheel for a vehicle as defined in claim 1, wherein said frame is composed of two frame members having axially distal portions engaging said tire and axially proximal portions connected with one another.

5. A wheel for a vehicle as defined in claim 2, wherein said frame has a cup-shaped cross section so that a portion of said wheel disc and said elastic member are received in the former.

6. A wheel for a vehicle as defined in claim 1, wherein said frame has a substantially cup-shaped cross section with two walls which are axially spaced from one another and axially surround a portion of said wheel disc; and further comprising friction-reducing members each arranged between each of said walls of said frame and said wheel disc.

7. A wheel for a vehicle as defined in claim 6, wherein said friction-reducing members are formed as ball members.

8. A wheel for a vehicle as defined in claim 1, wherein said contact surface of said tire is provided with suction formations increasing traction of the wheel with the road surface.

9. A wheel for a vehicle as defined in claim 8, wherein said formations include a plurality of pocket-shaped openings which are distributed over said contact surface of said tire and elongated in an axial direction.

10. A wheel of a vehicle as defined in claim 1; and further comprising an elastic member located outwardly of and connected with said wheel disc so that the driving moment is transmitted from said wheel disc element through said elastic member to said frame and to said tire, said elastic member forming said outer circumferential surface which cooperates with said inner circumferential surface of said frame and is interrupted.

11. A wheel of a vehicle as defined in claim 10, wherein said outer circumferential surface of said elastic member is provided with a plurality of projections which are spaced from one another in a circumferential direction by empty grooves therebetween, and said inner circumferential surface of said frame is smooth so that cooperation of said projections of said outer circumferential surface of said elastic member with said smooth inner circumferential surface of said frame simulates a walking movement.

12. A wheel of a vehicle as defined in claim 11, wherein said projections of said outer circumferential surface of said elastic member are tooth-shaped.

* * * * *